(12) United States Patent
Schonlau et al.

(10) Patent No.: US 8,479,608 B2
(45) Date of Patent: Jul. 9, 2013

(54) SERVO BRAKE

(75) Inventors: Jürgen Schonlau, Walluf (DE);
Manfred Rüffer, Sulzbach (DE);
Holger von Hayn, Bad Vilbel (DE);
Thomas Sellinger, Offenbach (DE);
Lazar Milisic, Kelkheim (DE)

(73) Assignee: Continental Teves AG & Co. oHG (DE)

( * ) Notice: Subject to any disclaimer, the term of this patent is extended or adjusted under 35 U.S.C. 154(b) by 822 days.

(21) Appl. No.: 12/525,112

(22) PCT Filed: May 23, 2007

(86) PCT No.: PCT/EP2007/055025
§ 371 (c)(1),
(2), (4) Date: Jan. 19, 2010

(87) PCT Pub. No.: WO2008/095546
PCT Pub. Date: Aug. 14, 2008

(65) Prior Publication Data
US 2010/0164277 A1    Jul. 1, 2010

(30) Foreign Application Priority Data

Feb. 3, 2007 (DE) .......................... 10 2007 005 459

(51) Int. Cl.
*G05G 1/30* (2008.04)
(52) U.S. Cl.
USPC ............................. 74/512; 74/560; 188/72.1
(58) Field of Classification Search
USPC .................. 74/512–514, 519, 560; 188/71.1, 188/72.1; 303/113.3
See application file for complete search history.

(56) References Cited

U.S. PATENT DOCUMENTS

| 5,350,225 | A | 9/1994 | Steiner et al. |
| 6,152,642 | A * | 11/2000 | Berthold et al. ............... 403/155 |
| 6,609,438 | B1 * | 8/2003 | Bigham et al. .................. 74/560 |
| 6,758,115 | B2 * | 7/2004 | Allen et al. ...................... 74/560 |
| 7,568,406 | B2 * | 8/2009 | Booher et al. ................... 74/512 |
| 2008/0196983 | A1 | 8/2008 | Von Hayn et al. |
| 2009/0115247 | A1 | 5/2009 | Leiber et al. |

FOREIGN PATENT DOCUMENTS

| DE | 42 08 496 C1 | 8/1993 |
| DE | 10 2004 011 622 A1 | 3/2005 |
| DE | 20 2005 018 018 U1 | 10/2006 |
| EP | 0 417 945 A2 | 3/1991 |
| WO | WO 2005/014351 A | 2/2005 |
| WO | WO 2006/111393 A1 | 10/2006 |

\* cited by examiner

*Primary Examiner* — Melanie Torres Williams
(74) *Attorney, Agent, or Firm* — RatnerPrestia

(57) ABSTRACT

A brake booster for a motor vehicle brake system of the brake-by-wire type, which can be activated both by means of a brake pedal and as a function of a driver's request, as well as independently of the driver's wish by means of an electronic control unit, wherein the coupling of the brake pedal, or of a force transmitting part which is permanently connected to the brake pedal, to an input member of the brake booster is embodied in such a way that the brake pedal or the force transmitting part can carry out a limited relative movement with respect to the input member. In order to minimize the friction which occurs between the force transmitting part and the input member when the brake booster is activated, the force transmitting part, and/or the input member of the brake booster are/is provided in the region of the relative movement of the two parts with respect to one another with means which reduce friction which occurs during the relative movement of the parts with respect to one another.

12 Claims, 8 Drawing Sheets

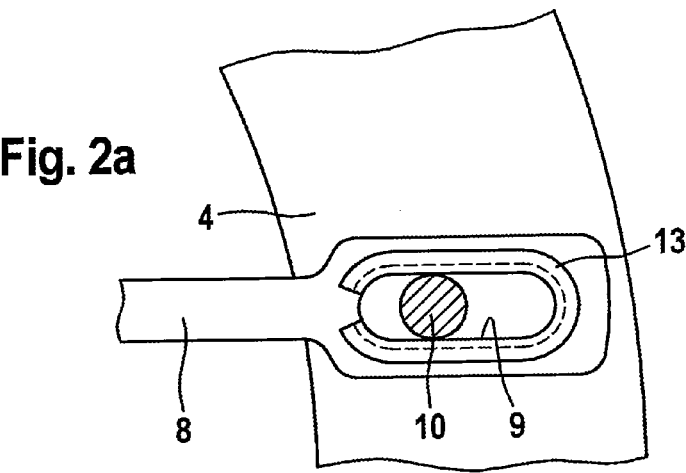
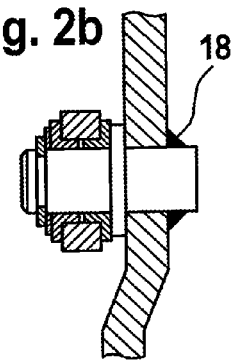
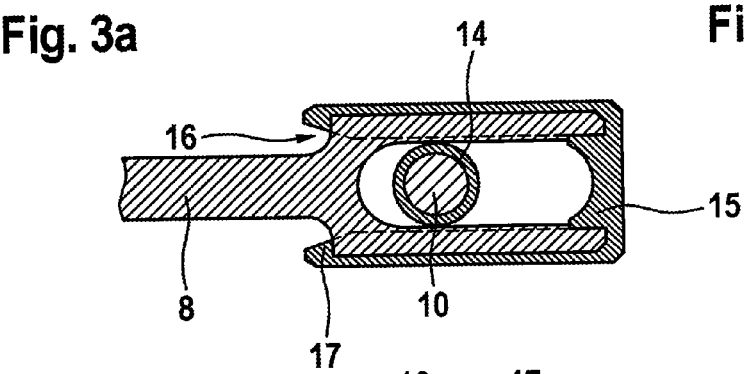
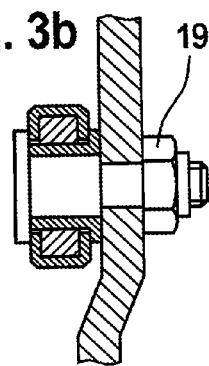
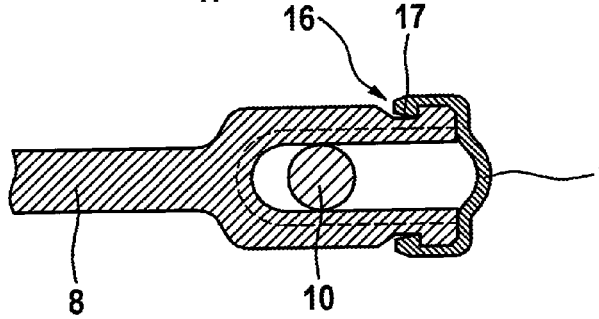
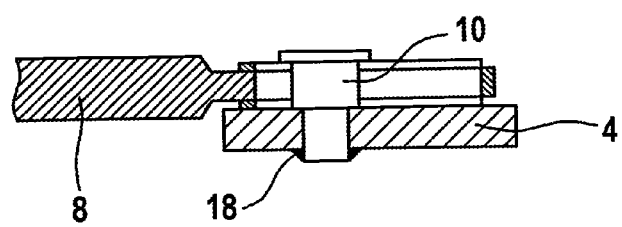

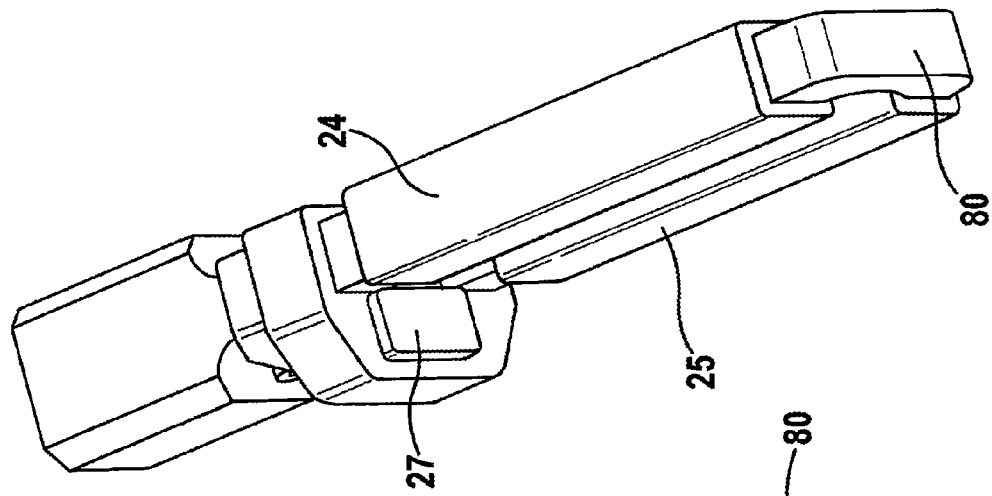
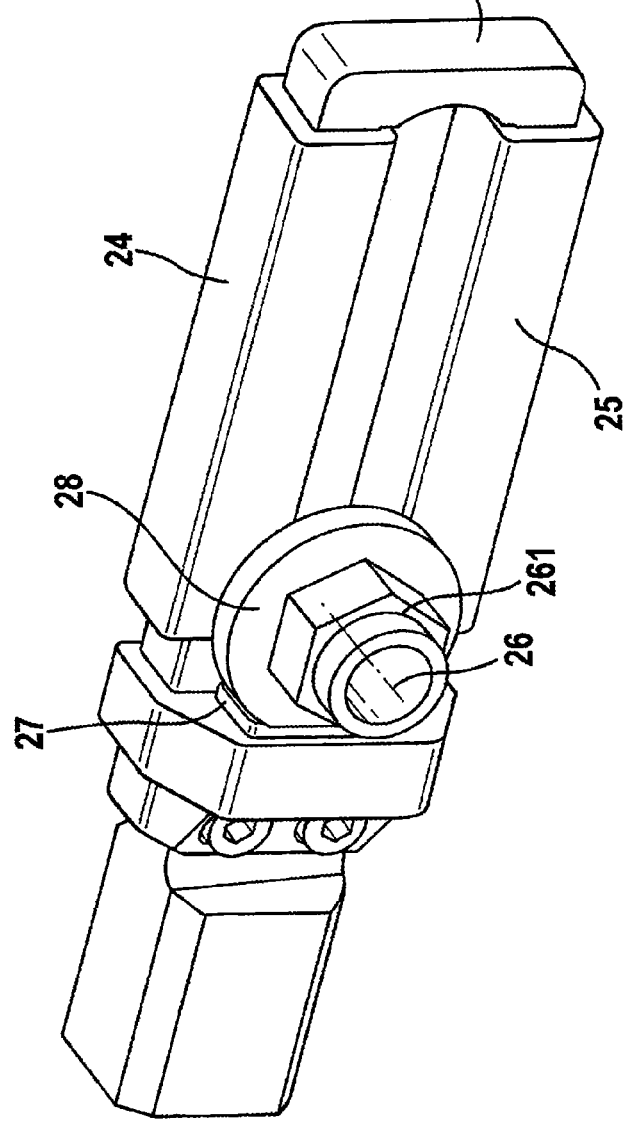
Fig. 7b
Fig. 7a

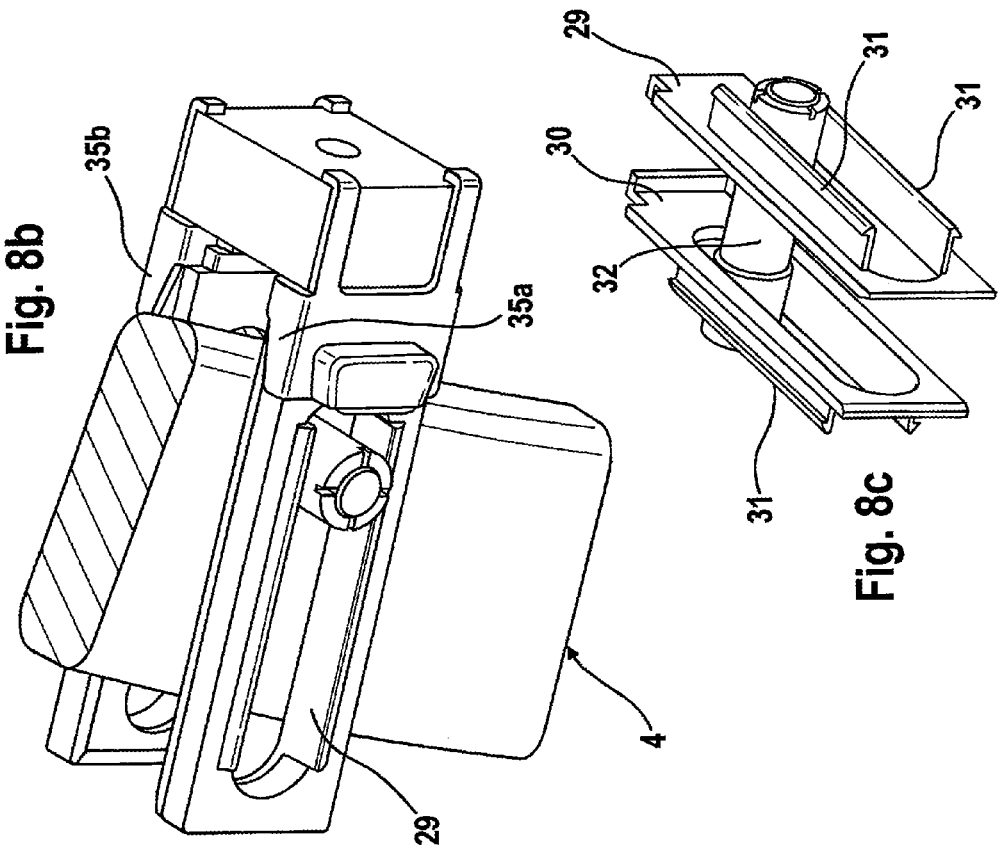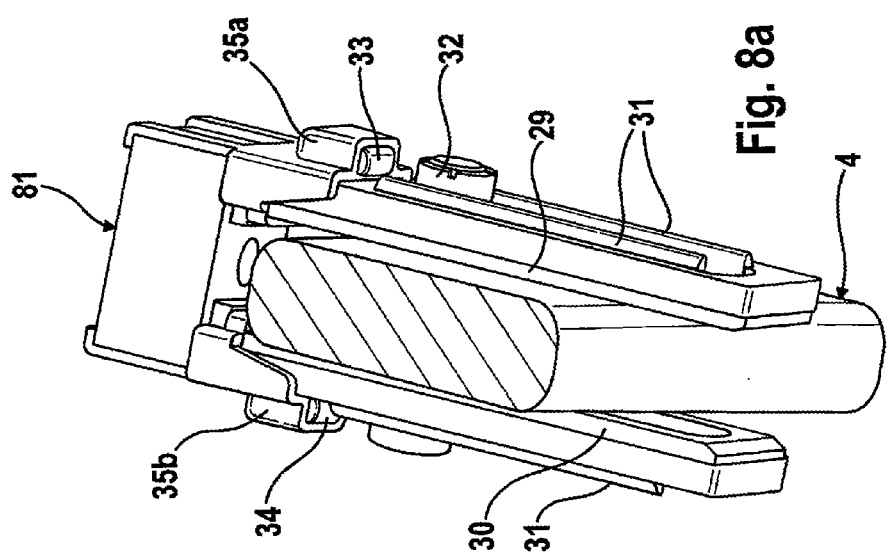

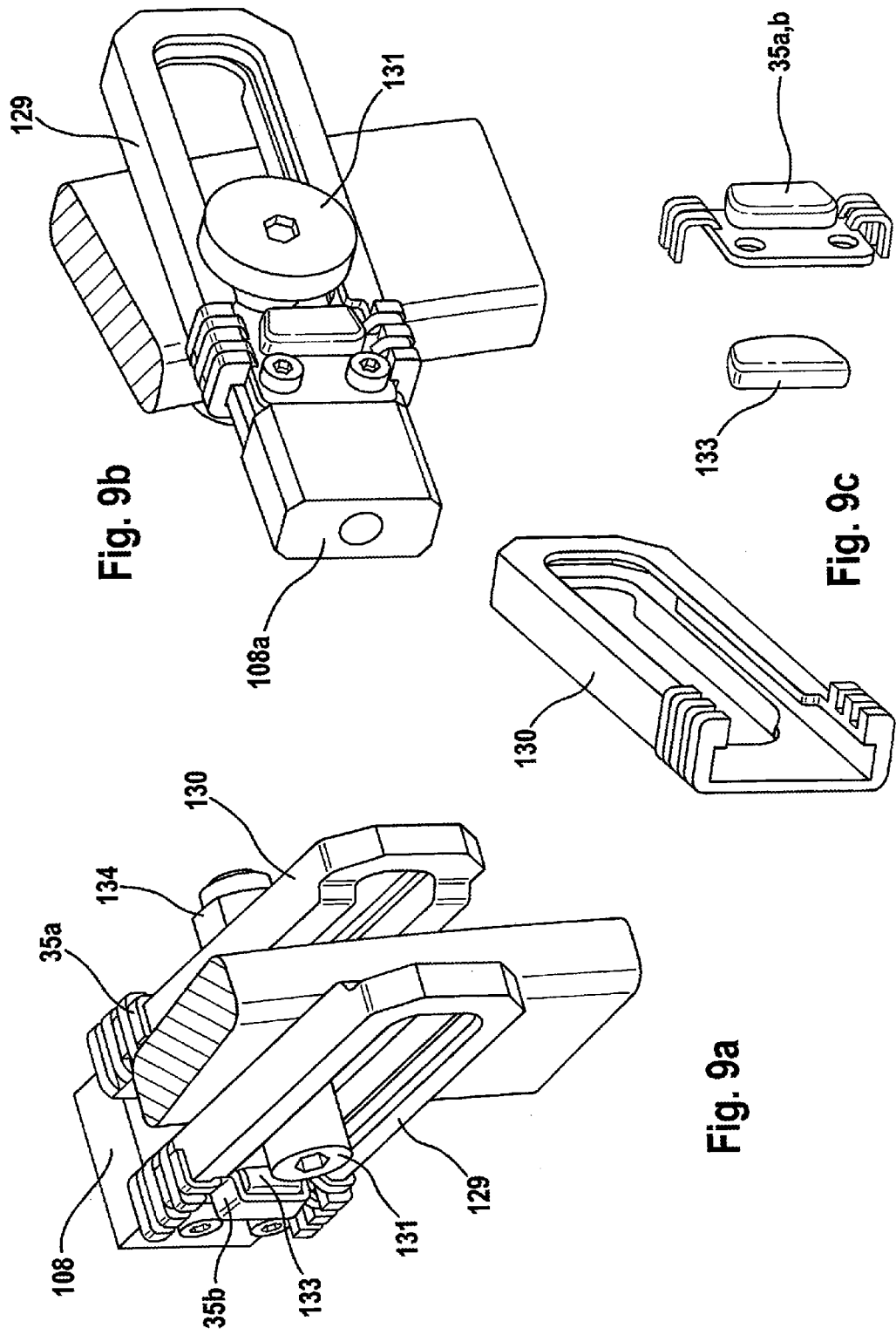

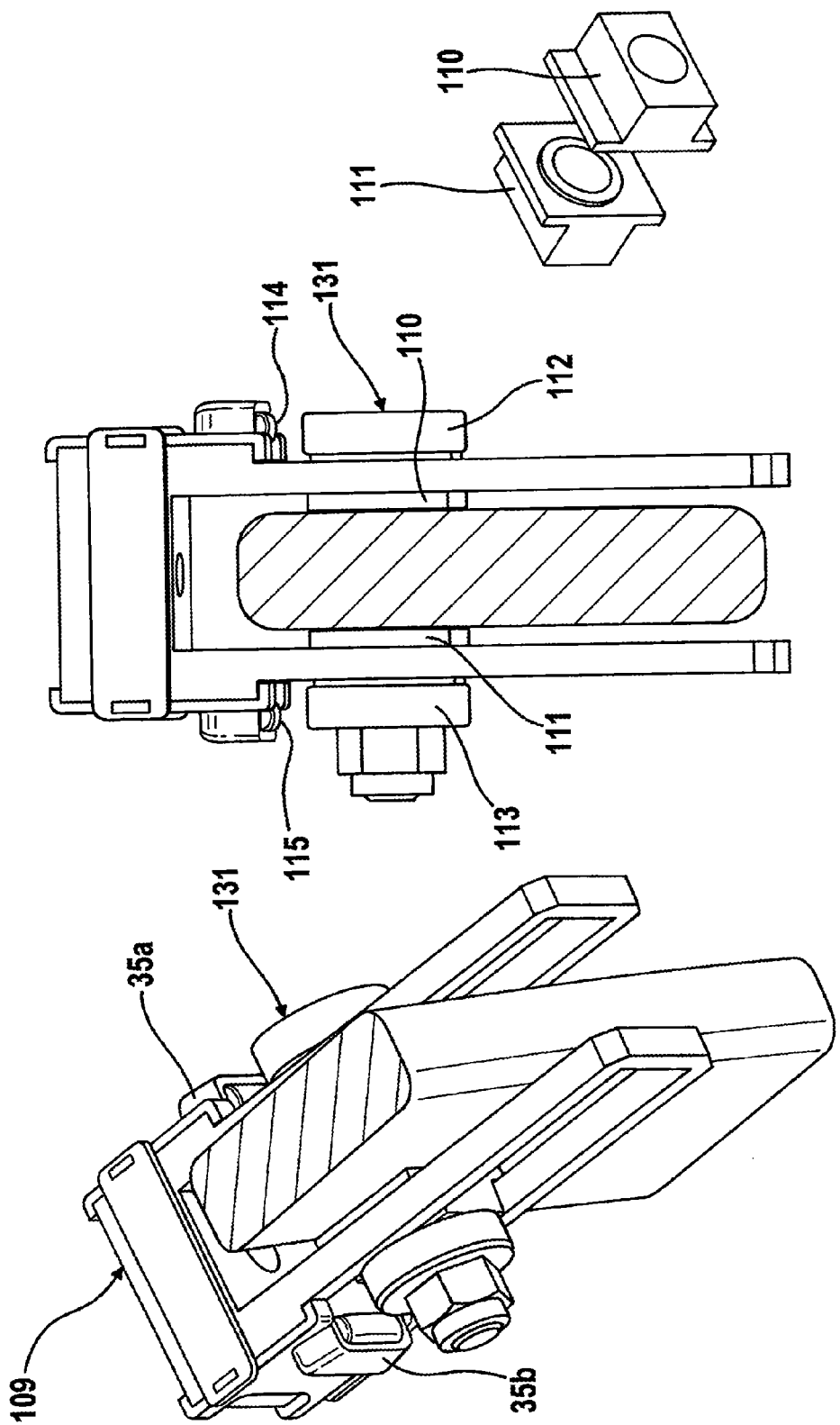

_US 8,479,608 B2_

SERVO BRAKE

CROSS REFERENCE TO RELATED APPLICATIONS

This application is the U.S. national phase application of PCT International Application No. PCT/EP2007/055025, filed May 23, 2007, which claims priority to German Patent Application No. DE102007005459.0, filed Feb. 3, 2007, the contents of such applications being incorporated by reference herein.

BACKGROUND OF THE INVENTION

1. Field of the Invention

The invention relates to a brake booster for a motor vehicle brake system of the brake-by-wire type, which can be activated both by means of a brake pedal and as a function of a driver's request, as well as independently of the driver's wish by means of an electronic control unit, wherein the coupling of the brake pedal, or of a force transmitting part which is permanently connected to the brake pedal, to an input member of the brake booster is embodied in such a way that the brake pedal or the force transmitting part which is permanently connected to the brake pedal can carry out a limited relative movement with respect to the input member, which ensures, in particular in the brake-by-wire operating mode, a decoupling of the force transmitting connection between the brake pedal or the force transmitting part which is permanently connected to the brake pedal.

2. Description of the Related Art

A brake booster is known from European patent EP 0 417 945 B1. A piston rod which forms the input member of the previously known brake booster has a longitudinal opening which holds a bolt which is permanently connected to a brake pedal. The longitudinal opening permits a limited relative movement of the input member with respect to the bolt or the brake pedal with the result that when the brake booster is used in a case of drive slip control or when the brake booster is actuated independently of the driver's wish, the input member moves in the direction of activation while the brake pedal remains stationary. The large amount of friction which occurs between the input member and the bolt causes a large amount of wear of said parts, causes them to corrode and generates noise which is felt to be unpleasant and disruptive by the driver of the vehicle.

SUMMARY OF THE INVENTION

An object of one or more aspects of the present invention is to improve a brake booster of the generic type mentioned at the beginning to the effect that the disadvantages specified above are very largely avoided.

In accordance with at least one aspect of the invention, the force transmitting part, which is permanently connected to the brake pedal, and/or the input member of the brake booster are/is provided in the region of the relative movement of the two parts with respect to one another with means which reduce friction which occurs during the relative movement of the parts with respect to one another.

BRIEF DESCRIPTION OF THE DRAWINGS

Further features and advantages of the invention emerge from the following description of exemplary embodiments with reference to the appended drawing, in which:

FIGS. 2a, b show a side view or a front view of a first embodiment of the subject matter of at least one aspect of the invention;

FIGS. 3a, b show a side view or a front view of a second embodiment of the subject matter according to at least one aspect of the invention;

FIGS. 4a, b show a side view or a plan view of a third embodiment of the subject matter according to at least one aspect of the invention;

FIGS. 7a, b show three-dimensional illustrations of a sixth embodiment of the subject matter according to at least one aspect of the invention;

FIGS. 8a, 8b and 8c show two three-dimensional illustrations and an illustration of a detail of sliding shoes of a seventh embodiment of the subject matter according to at least one aspect of the invention;

FIGS. 9a, 9b and 9c show two three-dimensional illustrations and an exploded illustration of a sliding shoe, of a damping element and of a securing part of an eighth embodiment of the subject matter according to at least one aspect of the invention;

FIGS. 11a, 11b and 11c show a three-dimensional illustration, a plan view and an illustration of a detail of sliding blocks of a tenth embodiment of the subject matter according to at least one aspect of the invention.

DETAILED DESCRIPTION OF THE PREFERRED EMBODIMENTS

Figure 1:
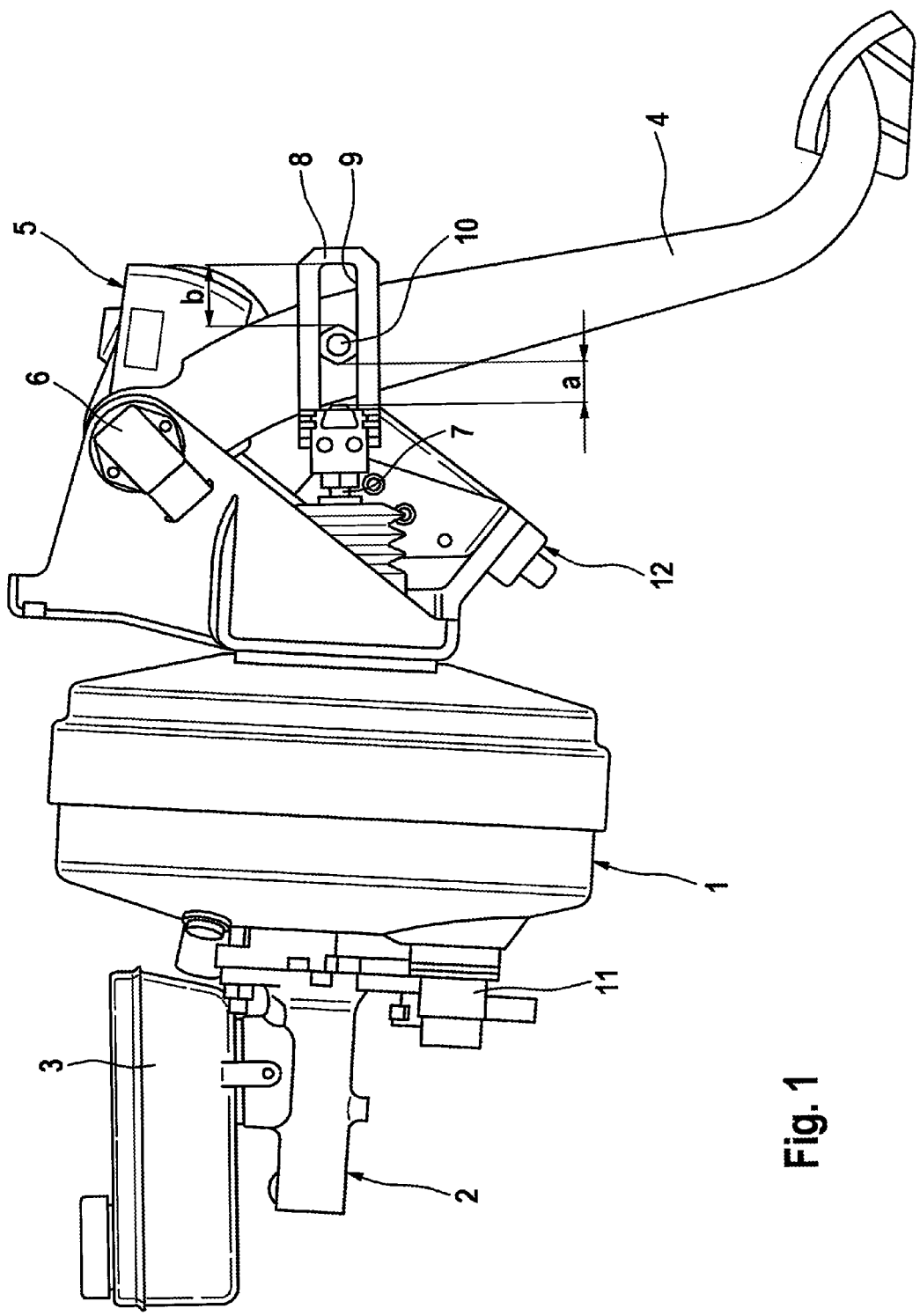
FIG. 1 shows an activation unit of a motor vehicle brake system of the brake-by-wire type with a brake booster according to the invention in a three-dimensional illustration.

The activation unit illustrated in FIG. 1 is composed of a brake booster, preferably an underpressure brake booster 1, a master brake cylinder, preferably a tandem master cylinder 2, which is connected downstream of the brake booster 1 and to whose pressure spaces (not illustrated) wheel brakes of the motor vehicle are connected with the intermediate connection of a hydraulic open-loop and closed-loop control unit (not illustrated either), as well as a pressure medium reservoir vessel 3 which is assigned to the master brake cylinder 2. A brake pedal 4 is used by the driver to activate the brake booster 1, with a pedal travel simulator 5 (only indicated) which interacts with the brake pedal 4, in particular in the brake-by-wire operating mode and which imparts the usual brake pedal sensation to the driver, being provided. Any driver deceleration request and/or the activation travel of the brake pedal 4 is/are sensed by means of at least one sensor device 6 whose signals are fed to an electronic control unit (not shown). The output signals of the electronic control unit can be used, inter alia, to actuate an electromagnet which is assigned to the brake booster 1 and which permits a pneumatic control value, which controls an air supply to the brake booster 1, to be activated independently of the driver's wish.

An input member which is coupled to the brake pedal 4, or a piston rod 7 which is used by the driver to activate the control valve mentioned above, has a piston rod head 8 in which a longitudinal opening 9 is formed. The longitudinal opening 9 holds a force transmitting part 10 which is connected to the brake pedal 4 and which is embodied as a bolt. In this context, the abovementioned parts 8, 10 are arranged in such a way that an axial gap or distance "a" which ensures decoupling of the force transmitting connection between the brake pedal 4 and the brake booster 1 in the brake-by-wire operating mode, is provided between the boundary of the longitudinal opening 9 which is on the left in the drawing and the bolt 10. An axial gap or distance "b" which is provided between the bolt 10 and the boundary of the longitudinal opening 9 which is on the left in the drawing prevents the brake pedal 4 from also being moved along when the brake booster 1 is actuated independently of the driver's wish. A travel sensor 11 is used to sense the travel of a movable wall which applies the boosting force of the brake booster 1, or the travel of an output member of the brake booster 1 which transmits its output force to a first piston (not illustrated) of the master brake cylinder 2.

The pedal travel simulator 5 by means of which, as already mentioned, a restoring force which acts on the brake pedal 4 can be simulated in the brake-by-wire operating mode independently of activation of the brake booster 1 is embodied in such a way that in the brake-by-wire operating mode it can be activated during the decoupling of the force transmitting connection between the brake pedal 4 and the brake booster 1 and deactivated outside the brake-by-wire operating mode by means of an activation and deactivation device 12, which is only indicated schematically.

In the first example (illustrated in FIGS. 2a, b) of the subject matter of at least one aspect of the invention, the abovementioned longitudinal guide opening 9 of the piston rod head 8 is provided with a lining 13 made of a plastic with good sliding properties, which lining 13 minimizes the friction which occurs between the piston rod head 8 and the bolt 10 when there is a relative movement thereof with respect to one another.

In the embodiments of the invention illustrated in FIGS. 3a, b and 4a, b, the bolt 10 is provided, in its region which is guided in the piston rod head 8, with a layer 14 which is made of a material with good sliding properties. The piston rod head 8 is embodied here as an open fork head which engages partially around the bolt 10 and which is provided at its open end with a closure part 15 which is connected to the fork head in a positively locking fashion, for example by means of a latching connection 16. For this purpose, the closure part 15 has latching projections 17 which engage behind surfaces which are embodied on the fork head 8 and are correspondingly shaped. The bolt 10 can be permanently connected to the brake pedal 4 by means of a welded connection 18 (FIGS. 2b, 4b) or can be attached to the brake pedal 4 by means of a self-locking threaded nut 19 (FIG. 3b).

Figure 5:
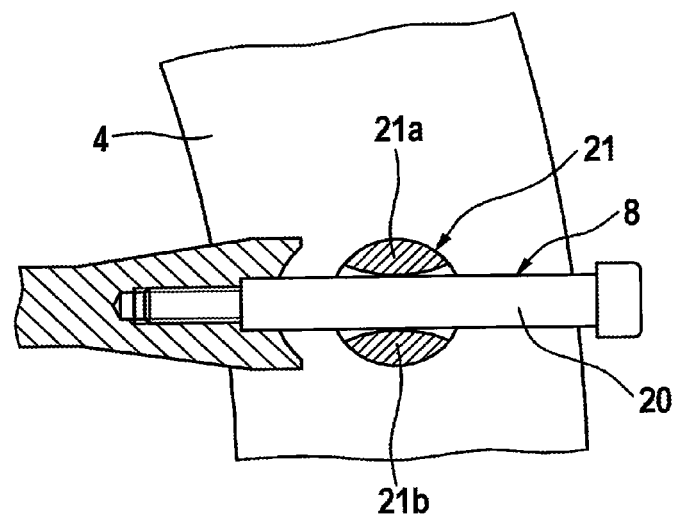
FIG. 5 shows a side view of a fourth embodiment of the subject matter according to at least one aspect of the invention.
Figures 6A, 6B:
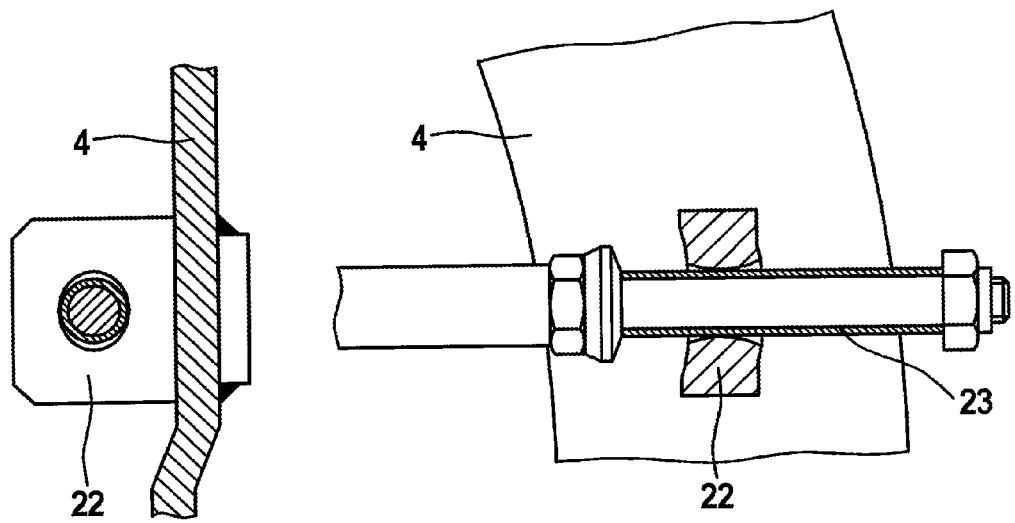
FIGS. 6a, b show a side view or a front view of a fifth embodiment of the subject matter according to at least one aspect of the invention.

In the further embodiments (illustrated in FIGS. 5 and 6) of the invention, the piston rod head 8 is embodied as an axial bolt 20 which is guided in a guide 21, 22 which is arranged on the brake pedal 4. In the embodiment shown in FIG. 5, the guide 21 is formed by two sliding segments 21a, b which are located opposite one another, while the bolt 20 is provided with a sliding layer 23 in the variant illustrated in FIG. 6. As is apparent in particular from FIG. 6b, the guide 22 is welded to the brake pedal 4.

In the further variant shown in FIGS. 7a, b, the single armed piston rod head 80 is provided with sliding surfaces 24, 25 which are composed of a suitable plastic with which the piston rod head 8 is encapsulated by injection molding in its regions which guide the bolt 26 which is only indicated. A damping element 27, which is arranged at the end of the piston rod head 80 which faces away from the brake pedal (not shown), and on which damping element 27 a radial collar 28 of the bolt 26 impacts with a relatively large diameter at the end of the activation travel, is used for damping the brake pedal stop. In order to secure the bolt 26, a threaded nut 261 is provided.

In the embodiment illustrated in FIGS. 8a-c, the piston rod head 81 is embodied as a two armed fork head which is in the form of a milled part. However, it is also conceivable to embody the fork head as a welded bent part. In order to reduce the abovementioned friction, sliding shoes 29, 30 are provided which can be mounted from the inside on the fork head and are connected thereto by means of a positively locking connection, for example by means of latching elements 31. The surfaces of the abovementioned sliding shoes 29, 30 which face the brake pedal 4 ensure effective guidance of the brake pedal 4 during the activation. In the variant shown, the bolt 32 is embodied in two or more parts, with its stop being damped on the fork head by means of elastic damping elements 33, 34 which are secured by means of securing parts 35a, 35b. Alternatively, a single damping element (not illustrated) can be arranged in the front region of the fork head 81, between its arms.

In the exemplary embodiment shown in FIGS. 9a-c, the sliding shoes 129, 130 are plugged onto the fork head 108 and are secured by means of the securing parts 35 which are mentioned in conjunction with FIGS. 8a, b and which also secure elastic damping elements 133, —for damping the stop of the bolt 131 or its securing nut 134 and therefore fix their position at the end of the fork head 108. While the fork head 108 which is illustrated in FIG. 9a is formed by a two armed milled part, the fork head 108a shown in FIG. 9b is of one armed design. FIG. 9c shows exploded illustrations of the sliding shoe 130, of the damping element 133 and of the securing part 35a, b, which can be used for both embodiments of the fork head 108, 108a. A latched arrangement of the sliding shoes 129, 130 permits the securing part 35 to be offset and therefore to adapt to the size of the bolt 131 a.

Figure 10:
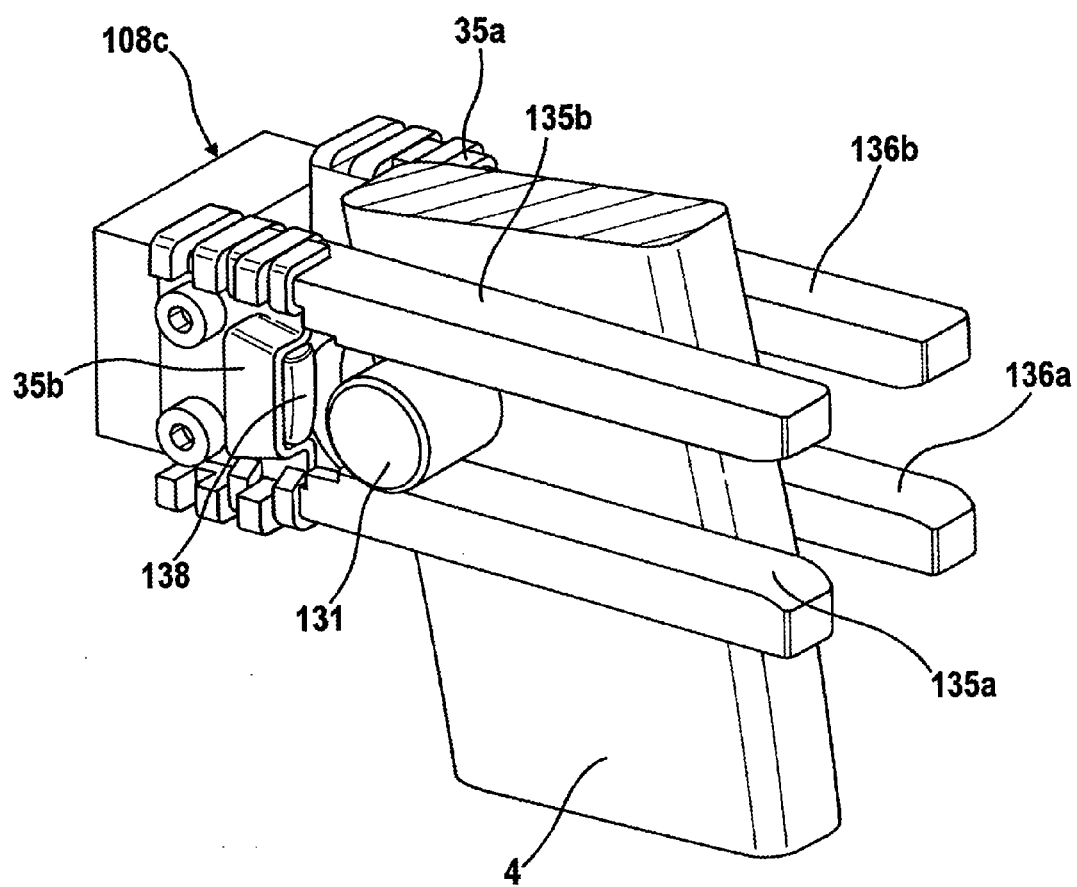
FIG. 10 shows a three-dimensional illustration of a ninth embodiment of the subject matter according to at least one aspect of the invention.

The design of the ninth exemplary embodiment of the subject matter of at least one aspect of the invention which is illustrated in FIG. 10 corresponds largely to that of the embodiment which is shown in FIG. 9a. The main difference between the abovementioned two embodiments is the design of the fork head which is embodied in the design according to FIG. 10 as fork head 108c which is open at the end and on whose arms sleeve-like sliding shoes 135a, b, 136a, b, which are secured by means of the securing elements 35a, b for damping elements—, 138, are plugged. The abovementioned sliding shoes can, of course, also be fabricated by encapsulating the fork head 108c with a suitable plastic by injection molding.

Finally, in the tenth embodiment shown in FIGS. 11a, b, c, the fork head 109 which is closed at its end is embodied as a two armed milled part in whose longitudinal openings which are located opposite one another sliding blocks 110, 111 are guided, said sliding blocks 110, 111 being arranged at the ends of the bolt 131. The parts 112, 113 of the bolt 132 which are located outside the fork head 109 interact, as in the preceding examples, with damping elements 114, 115. Alternatively, the correspondingly shaped sliding blocks 110, 111 can also be used as stops for the brake pedal 4.

The invention claimed is:
1. A brake booster for a motor vehicle brake system of the brake-by-wire type, which can be activated both by means of a brake pedal and as a function of a driver's request, as well as independently of the driver's wish by means of an electronic control unit, wherein the coupling of the brake pedal or of a force transmitting part permanently connected to the brake pedal, to an input member of the brake booster is embodied in such a way that the brake pedal or the force transmitting part can carry out a limited relative movement with respect to the input member, wherein the force transmitting part which is permanently connected to the brake pedal, and/or the input member of the brake booster are/is provided in the region of the relative movement of the two parts with respect to one another with means which reduce friction which occurs during the relative movement of the parts with respect to one another, and wherein the input member has at least one elastic damping element at a distal end of the movement range of the brake pedal or of the force transmitting part for damping a stopping motion of the brake pedal.

2. The brake booster as claimed in claim 1, wherein the input member of the brake booster has, at its end facing the brake pedal a piston rod head, which is provided with a longitudinal guide opening, wherein the force transmitting part is formed by a bolt which is guided in the longitudinal guide opening.

3. The brake booster as claimed in claim 2, wherein the longitudinal guide opening is provided with a plastic lining and/or a sleeve and/or the bolt are/is provided with a plastic sleeve.

4. The brake booster as claimed in claim 1, wherein the piston rod head is embodied as a fork head which at least partially engages around the bolt.

5. The brake booster as claimed in claim 4, wherein the fork head is of open design at its end facing the brake pedal and is closed off by means of a closure part which is connected to the fork head in a positively locking fashion.

6. The brake booster as claimed in claim 4, wherein the fork head is of single armed design and is provided, in its region which guides the bolt, with sliding shoes which are arranged opposite one another and are formed by encapsulating the fork head with plastic by injection molding.

7. The brake booster as claimed in claim 4, wherein the fork head is of two armed design and has, in its region which guides the bolt, sliding shoes which are arranged opposite one another, can be mounted from the inside and are attached to the fork head by means of a positively locking connection.

8. The brake booster as claimed in claim 4, wherein the fork head is of single armed design or two armed design and has, in its region which guides the bolt a sliding shoe or two sliding shoes which are arranged opposite one another and are plugged onto the arm or arms of the fork head and are secured by means of securing parts.

9. The brake booster as claimed in claim 8, wherein the fork head is of open design at its end facing the brake pedal.

10. The brake booster as claimed in claim 1, wherein securing parts hold the elastic damping elements for damping the impact of the bolt.

11. The brake booster as claimed in claim 4, wherein the fork head is of two armed design, and the bolt is provided with sliding blocks which are guided in the longitudinal guide openings in the fork head.

12. The brake booster as claimed in claim 1, wherein the piston rod head is embodied as an axial bolt which is guided in a sliding guide which is embodied on the brake pedal.

* * * * *

UNITED STATES PATENT AND TRADEMARK OFFICE
CERTIFICATE OF CORRECTION

PATENT NO. : 8,479,608 B2
APPLICATION NO. : 12/525112
DATED : July 9, 2013
INVENTOR(S) : Schonlau et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this
Eighth Day of September, 2015

Michelle K. Lee
*Director of the United States Patent and Trademark Office*